US011751037B2

(12) United States Patent
Bot et al.

(10) Patent No.: US 11,751,037 B2
(45) Date of Patent: Sep. 5, 2023

(54) SYSTEM AND METHOD FOR DISTRIBUTING MULTIMEDIA PUBLIC WARNING ALERTS IN A MOBILE TELECOMMUNICATIONS NETWORK

(71) Applicant: ONE2MANY B.V., Deventer (NL)

(72) Inventors: Menno Jonathan Bot, Deventer (NL); Peter Sanders, Deventer (NL)

(73) Assignee: ONE2MANY B.V., Deventer (NL)

( * ) Notice: Subject to any disclaimer, the term of this patent is extended or adjusted under 35 U.S.C. 154(b) by 267 days.

(21) Appl. No.: 17/311,819

(22) PCT Filed: Jan. 15, 2020

(86) PCT No.: PCT/EP2020/050924
§ 371 (c)(1),
(2) Date: Jun. 8, 2021

(87) PCT Pub. No.: WO2020/148340
PCT Pub. Date: Jul. 23, 2020

(65) Prior Publication Data
US 2022/0030410 A1  Jan. 27, 2022

(30) Foreign Application Priority Data

Jan. 18, 2019 (NL) ..................... 2022415

(51) Int. Cl.
*H04W 4/00* (2018.01)
*H04W 4/90* (2018.01)
(Continued)

(52) U.S. Cl.
CPC .............. *H04W 4/90* (2018.02); *H04W 4/08* (2013.01); *H04W 52/0229* (2013.01); *H04W 68/005* (2013.01)

(58) Field of Classification Search
CPC ....... H04W 4/90; H04W 68/005; H04W 4/06; H04W 76/40; H04W 76/50
See application file for complete search history.

(56) References Cited

U.S. PATENT DOCUMENTS

2007/0124359 A1\* 5/2007 Hwang ................. H04H 60/07
709/200
2013/0315130 A1  11/2013 Enomoto et al.
(Continued)

FOREIGN PATENT DOCUMENTS

EP  1936876 A1  6/2008

OTHER PUBLICATIONS

International Search Report and Written Opinion for the International Patent Application No. PCT/EP2020/050924, dated Feb. 25, 2020, 13 pages.
(Continued)

*Primary Examiner* — Omoniyi Obayanju
(74) *Attorney, Agent, or Firm* — KDW Firm PLLC

(57) ABSTRACT

Method for distributing multimedia public warning alerts in a mobile telecommunications network, including: creating an alert message by an emergency authority computer in the network, the message including a textual message and a multimedia object; sending by a content distributor server parameters for a content delivery session; sending by the computer the created message to the server; sending by the computer a request for a cell broadcast message to a cell broadcast center in the network, the message including the textual message and content delivery session parameters; broadcasting by the cell broadcast center the message through a radio access network; receiving by mobile user equipment in the network the message through the radio access network; setting up by the multicast content distributor server a transparent IP multicast session between the
(Continued)

server and at least some of the user equipment; sending the multimedia object though the session to the user equipment.

15 Claims, 1 Drawing Sheet

(51) Int. Cl.
*H04W 4/08* (2009.01)
*H04W 52/02* (2009.01)
*H04W 68/00* (2009.01)

(56) References Cited

U.S. PATENT DOCUMENTS

| | | | |
|---|---|---|---|
| 2014/0050137 A1 | 2/2014 | Alberth, Jr. et al. | |
| 2016/0127439 A1 | 5/2016 | Ginnela et al. | |
| 2020/0015062 A1* | 1/2020 | Tränk | H04W 4/021 |

OTHER PUBLICATIONS

"3rd Generation Partnership Project; Technical Specification Group Services and System Aspects; Study on Machine-Type Communications (MTC) and other mobile data applications communications enhancements (Release 12)", 3GPP Standard; 3Gpp TR 23.887, 3rd Generation Partnership Project (3GPP), Mobile Competence Centre, Route De Lucioles; F-06921 Sophia-Antipolis Cedex; France, vol. 1 SA WG2 No. V12.0.0, Dec. 20, 2013, pp. 1-151.
International Preliminary Reporton Patentability for the International Patent Application No. PCT/EP2020/050924, dated Jun. 16, 2021, 9 pages.

* cited by examiner

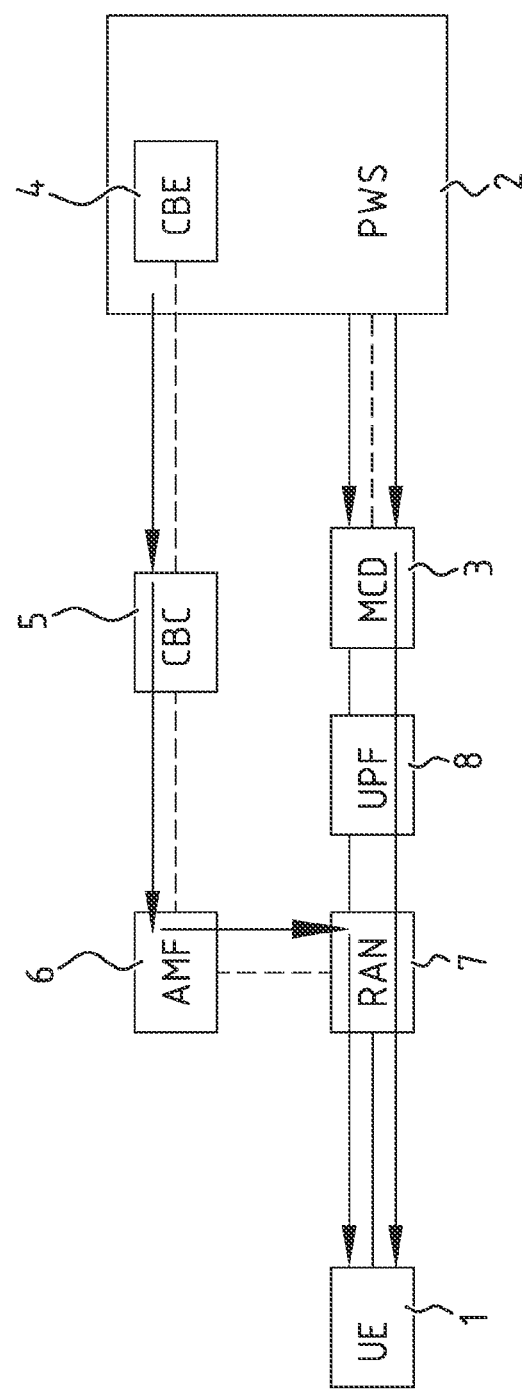

SYSTEM AND METHOD FOR DISTRIBUTING MULTIMEDIA PUBLIC WARNING ALERTS IN A MOBILE TELECOMMUNICATIONS NETWORK

This is a national stage application filed under 35 U.S.C. § 371 of pending international application PCT/EP2020/050924, filed Jan. 15, 2020, which claims priority to Netherlands Patent Application No. 2022415, filed Jan. 18, 2019, the entirety of which applications are hereby incorporated by reference herein.

The invention relates to a method for distributing multimedia public warning alerts in a mobile telecommunications network.

Since the United States (US) congress in 2006 passed the Warning, Alert, and Response Network (WARN) Act, various countries have adopted emergency alerting over wireless. In many countries (New Zealand, The Netherlands, USA, etc.) Cell Broadcast (CB) is used as a technology to quickly deliver alerts to the population in a specific area. As Cell Broadcast uses the signaling channel to broadcast the alerts, one of the benefits is that the usage of Cell Broadcast doesn't significantly increase the network load whilst the network itself may already be under stress due to the effects of an emergency.

The 3GPP standardization forum specified the use of broadcast in LTE with the adoption of evolved Multimedia Broadcast Multicast Services (eMBMS). Using eMBMS it is possible to broadcast multimedia content to a large number of users whilst using a fixed number of resources. However using eMBMS to deliver a public warning service has several limitations, one is that no standardized trigger is defined for a User Equipment to automatically fetch content using eMBMS. 5G New Radio (NR) is the wireless standard that will become the foundation for the next generation of mobile networks.

Besides sending an alert description as textual information, it could be useful to send instructions also as audio (for the hearing impaired), a video with handling instructions or a map with the affected area. These are currently not possible as Cell Broadcast was intended to provide textual information. In theory images could be sent but the maximum size of a binary message is 9600 octets whilst many User Equipment do not support the receipt of binary messages.

Besides general emergencies, Cell Broadcast is also used to deliver amber alert. An amber alert is issued for a missing child with the intend of getting the public to help in quickly finding the child's whereabouts. The ability to add a picture to the amber alert would help beyond a textual description of a child's appearance.

The invention aims at a reliable, effective and efficient solution for this.

To that end the method in accordance with the invention comprises the steps of:

creating an alert message by an emergency authority computer in said network, said message comprising a textual message and at least one multimedia object, such as a picture, audio or video;

sending by said emergency authority computer a request for a content delivery session from a multicast content distributor server in said network;

sending by said multicast content distributor server in response to said request for a content delivery session parameters for a content delivery session, said parameters comprising a multicast IP address;

sending by said emergency authority computer the created alert message to the multicast content distributor server;

sending by said emergency authority computer a request for sending a cell broadcast message to a cell broadcast center in said network, said cell broadcast message comprising said textual message and said content delivery session parameters;

broadcasting by said cell broadcast center said cell broadcast message through a radio access network in said network;

receiving by a plurality of mobile user equipment in said network said cell broadcast message through said radio access network;

waking up said plurality of mobile user equipment and displaying by a public warning application on said plurality of mobile user equipment said textual message of said cell broadcast message on said plurality of mobile user equipment;

generating on at least a part of said plurality of user equipment by said public warning application a multicast join message using said content delivery session parameters and sending by said at least part of said plurality of user equipment said multicast join message to the multicast content distributor server through said radio access network;

setting up by the multicast content distributor server a transparent IP multicast session between the multicast content distributor server and said at least part of said multitude of user equipment;

sending said at least one multimedia object though said transparent IP multicast session to said at least part of said multitude of user equipment.

The content delivery session parameters further preferably comprise a URL for multicasting said at least one multimedia object to user equipment in said network, and said public warning application is further arranged to cause user equipment to download from said URL said at least one multimedia object using multicast from the multicast content distributor server through said radio access network depending on a setting of said public warning application, and/or in response to a user input in said public warning application. The setting of the public warning application can for instance be set such that said public warning application is arranged to cause user equipment to download from said URL said at least one multimedia object using unicast from the multicast content distributor server through said radio access network automatically, by setting up a unicast session between the radio access network and said user equipment by the multicast content distributor server using the multicast IP address in said multicast join message, upon opening the public warning application, provided that the at least one multimedia object has not been downloaded before by the public warning application.

The alert message created by an emergency authority computer preferably comprises at least one location, said cell broadcast message comprises said location, and said cell broadcast center broadcasts said cell broadcast message through said radio access network in only to cells in said location.

The radio access network may be a $4^{th}$ Generation Long Term Evolution (4G LTE), $5^{th}$ Generation New Radio (5G NR) or higher generation cellular mobile communications network. The at least one multimedia object may have a size which is larger than the maximum possible size for said cell broadcast messages, for instance larger than 9600 octets (bytes). Waking up said plurality of mobile user equipment may be achieved by paging. The message broadcasted by said by said cell broadcast center may be partitioned in system information blocks, and said public warning application may display said textual message of said cell broadcast message on said mobile user equipment when all the system information blocks have been received. The multicast join message may be an Internet Group Management Protocol (IGMP) join message (for instance the IPv4 or IPv6 variant).

The invention furthermore relates to a system for distributing multimedia public warning alerts in a mobile telecommunications network, comprising:

an emergency authority computer in said network;

a multicast content distributor server in said network;

a multitude of user equipment in said network, said user equipment being provided with a public warning application;

wherein said emergency authority computer is arranged to create an alert message, said message comprising a textual message and at least one multimedia object, such as a picture, audio or video, and to send a request for a content delivery session from said multicast content distributor server;

wherein said multicast content distributor server is arranged to send in response to said request for a content delivery session parameters for a content delivery session, said parameters comprising a multicast IP address;

wherein said emergency authority computer is arranged to send the created alert message to the multicast content distributor server; and a request for sending a cell broadcast message to a cell broadcast center in said network, said cell broadcast message comprising said textual message and said content delivery session parameters; said cell broadcast center being arranged to broadcast said cell broadcast message through a radio access network in said network;

wherein said plurality of mobile user equipment is arranged to receive said cell broadcast message through said radio access network;

wherein said public warning application is arranged to wake up said user equipment and display said textual message of said cell broadcast message on said user equipment; to generate on said user equipment a multicast join message using said content delivery session parameters and to send said multicast join message to the multicast content distributor server through said radio access network;

wherein the multicast content distributor server is arranged to set up a transparent IP multicast session between the multicast content distributor server and at least part of said multitude of user equipment that sent said multicast join message; and to send said at least one multimedia object though said transparent IP multicast session to said at least part of said multitude of user equipment.

The invention also relates to a multicast content distributor server for distributing multimedia public warning alerts in a mobile telecommunications network using the above method, wherein said multicast content distributor server is arranged to:

send in response to said request for a content delivery session parameters for a content delivery session, said parameters comprising a multicast IP address;

set up a transparent IP multicast session between the multicast content distributor server and at least part of said multitude of user equipment that sent said multicast join message; and send said at least one multimedia object though said transparent IP multicast session to said at least part of said multitude of user equipment.

The invention also relates to a public warning application for receiving multimedia public warning alerts on a user equipment, such as a mobile phone, in a mobile telecommunications network, said multimedia public warning alerts being distributed in accordance with the above method, wherein said public warning application is arranged to:

wake up said user equipment and display said textual message of said cell broadcast message on said user equipment;

generate on said user equipment a multicast join message using said content delivery session parameters and to send said multicast join message to the multicast content distributor server through said radio access network; and receive said at least one multimedia object though said transparent IP multicast session.

The invention will now be exemplified by means of a preferred embodiment, with reference to the drawing in the FIGURE, which is a schematic view of a mobile telecommunications network in accordance with the invention.

This invention presents a solution for delivering multimedia alerts using a combination of 5G Cell Broadcast and transparent multicast. A multimedia capable public warning system is described that is delivered using Cell Broadcast (CB) and transparent multicast. Cell Broadcast is used to trigger user equipment (UE) 1 in affected areas to fetch the multimedia content. The cell broadcast message delivers both essential information for the user about the warning as well as information for the User Equipment 1 to fetch the additional multimedia content. When all the User Equipment 1 in the affected areas collect the content using multicast, the 5G Radio Access Network will create a shared radio resource to deliver the multicast.

Using the Public Warning System (PWS) 2, a public warning message is created by the emergency authorities on a computer. The information for the public warning message is derived from electronic interfaces feeding the Public Warning System 2 or manually entered by the emergency authorities personnel. As result of the public warning message creation a Common Alert Protocol (CAP) message is created which contains information about the alert including elements like:

location;

textual message;

alert parameters like severity, urgency; and multimedia objects pertaining additional information on the alert (pictures, audio, video).

A new element is introduced, a Multicast Content Distributor (MCD) 3. The purpose of the Multicast Content Distributor 3 is to accept unicast content and deliver it to clients as multicast in a reliable manner.

The Public Warning System 2 will request a content delivery session from the Multicast Content Distributor 3. The Multicast Content Distributor 3 will return to the Public Warning System 2 parameters for the content delivery session. This includes the assigned multicast IP address and the URL (for unicast). The Public Warning System 2 will also deliver the Common Alert Protocol message as a file to the Multicast Content Distributor 3, this is the content that will be made available using multicast and optionally unicast.

The Cell Broadcast Entity 4 function in Public Warning System 2 will request a cell broadcast from the Cell Broadcast Center 5. The message will contain the location, textual alert message as well as the session parameters for the multimedia content (multicast IP address and URL). The Cell Broadcast Center 5 can map the location to cells. The Cell Broadcast Center 5 will send the Cell broadcast message to the relevant Access Mobility Function 6 which in turn will address the Radio Access Network 7.

The Radio Access Network 7 will deliver the Cell Broadcast message to the User Equipment 1. Paging is used to wake up the User Equipment 1 receivers that an Cell Broadcast message is present, the actual message will appear in System Information Blocks (SIB).

The Public Warning Application (PWA) on the User Equipment 1 will notify the user of the alert when all System Information Block messages have been collected. At that point the user can be alerted as the textual message can be presented. If the Public Warning Application is set to accept multimedia contents, or if the user has set the Public Warning Application to accept multimedia contents, the Public Warning Application can in parallel start to collect the multimedia contents using the metadata in the Cell Broadcast message using multicast. The user can also accept the multimedia contents in response to the textual message in the Public Warning Application later, in which case unicast may be used.

Assuming multicast is used, an Internet Group Management Protocol (IGMP) IP multicast join message is generated by the User Equipment 1 and send to the Radio Access Network 7. This results in a transparent IP multicast session being setup when multiple User Equipment 1 perform the same join. The transparent IP multicast session shares resources, automatically optimized by the Radio Access Network 7. The Radio Access Network 7 will join the multicast session through the User Plane Function 8 and the multicast data will be delivered from the Multicast Content Distributor 3 through the User Plane Function 8 to the Radio Access Network 7 onto the radio.

The Public Warning Application may be arranged to cause the user equipment to download from the URL the multimedia object by setting up a unicast session between the Radio Access Network 7 and the user equipment by the Multicast Content Distributor 3, using the multicast IP address in the join message.

With the user equipment always performing an IGMP join to receive the public warning alert message contents, the decision to deliver the contents over the radio as unicast or multicast can reside in the Radio Access Network 7 (which may for instance be an eNodeB or gNodeB). The Radio Access Network 7 will make a decision depending on efficiency. If there are only few user equipment in the same area, unicast could be used, and multicast can be used when there is a large number of user equipment.

Alternatively, instead of IGMP, another protocol could be used, such as HTTP, to notify a server of the intent to receive the multimedia content. The server should decide on unicast or multicast delivery and notify the user equipment accordingly. In case of unicast, a tunnel could be used to bridge portions of the network that are not multicast capable. The server can support the user equipment in the setup of the tunnel and also perform an IGMP join on the tunnel, so that regardless of tunnel or any other method, the content is delivered as multicast.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawing shall be used to interpret the claims. The claims should not be interpreted as meaning that the extent of the protection sought is to be understood as that defined by the strict, literal meaning of the wording used in the claims, the description and drawing being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

LIST OF ACRONYMS

AMF Access Mobility Function
CBC Cell Broadcast Center
CBE Cell Broadcast Entity
MCD Multicast Content Distributor
PWS Public Warning System
RAN Radio Access Network
UPF User Plane Function
UE User Equipment

The invention claimed is:

1. A method for distributing multimedia public warning alerts in a mobile telecommunications network, comprising the steps of: creating an alert message by an emergency authority computer in said network, said alert message comprising a textual message and at least one multimedia object; sending by said emergency authority computer a request for a content delivery session from a multicast content distributor server in said network; sending by said multicast content distributor server in response to said request for one or more content delivery session parameters for a content delivery session, said content delivery session parameters comprising a multicast Internet Protocol (IP) address; sending by said emergency authority computer the created alert message to the multicast content distributor server; sending by said emergency authority computer a request for sending a cell broadcast message to a cell broadcast center in said network, said cell broadcast message comprising said textual message and said content delivery session parameters; broadcasting by said cell broadcast center said cell broadcast message through a radio access network in said network; receiving by a plurality of mobile user equipment in said network said cell broadcast message through said radio access network; waking up said plurality of mobile user equipment and displaying by a public warning application on said plurality of mobile user equipment said textual message of said cell broadcast message on said plurality of mobile user equipment; generating on at least a part of said plurality of user equipment by said public warning application a multicast join message using said content delivery session parameters and sending by said at least part of said plurality of user equipment said multicast join message to the multicast content distributor server through said radio access network; setting up by the multicast content distributor server a transparent IP multicast session between the multicast content distributor server and said at least part of said multitude of user equipment; and sending said at least one multimedia object though said transparent IP multicast session to said at least part of said multitude of user equipment.

2. The method of claim 1, wherein said content delivery session parameters further comprise a URL for multicasting said at least one multimedia object to user equipment in said network, and said public warning application is further arranged to cause user equipment to download from said URL said at least one multimedia object using multicast from the multicast content distributor server through said radio access network depending on a setting of said public warning application, and/or in response to a user input in said public warning application.

3. The method of claim 2, wherein the setting of the public warning application is settable such that said public warning application is arranged to cause user equipment to download from said URL said at least one multimedia object using unicast from the multicast content distributor server through said radio access network automatically upon opening the public warning application, provided that the at least one multimedia object has not been downloaded before by the public warning application.

4. The method of claim 2, wherein said public warning application is arranged to cause said user equipment to download from said URL said at least one multimedia object automatically by setting up a unicast session between the radio access network and said user equipment by the multicast content distributor server using the multicast IP address in said multicast join message.

5. The method of claim 1, wherein said alert message created by an emergency authority computer comprises at least one location, said cell broadcast message comprises said location, and said cell broadcast center broadcasts said cell broadcast message through said radio access network only to cells in said location.

6. The method of claim 1, wherein said radio access network is a $5^{th}$ Generation New Radio (5G NR) or higher generation cellular mobile communications network.

7. The method of claim 1, wherein said at least one multimedia object has a size which is larger than a maximum possible size for said cell broadcast messages.

8. The method of claim 1, wherein waking up said plurality of mobile user equipment is done by paging.

9. The method of claim 1, wherein the message broadcasted by said by said cell broadcast center is partitioned in system information blocks, and said public warning application displays said textual message of said cell broadcast message on said mobile user equipment when all the system information blocks have been received.

10. The method of claim 1, wherein said multicast join message is an Internet Group Management Protocol (IGMP) join message.

11. A system for distributing multimedia public warning alerts in a mobile telecommunications network, comprising: an emergency authority computer in said network; a multicast content distributor server in said network; a multitude of user equipment in said network, said user equipment being provided with a public warning application; wherein said emergency authority computer is arranged to create an alert message, said message comprising a textual message and at least one multimedia object, and to send a request for a content delivery session from said multicast content distributor server; wherein said multicast content distributor server is arranged to send in response to said request for one or more content delivery session parameters for a content delivery session, said content delivery session parameters comprising a multicast Internet Protocol (IP) address; wherein said emergency authority computer is arranged to send the created alert message to the multicast content distributor server; and a request for sending a cell broadcast message to a cell broadcast center in said network, said cell broadcast message comprising said textual message and said content delivery session parameters; said cell broadcast center being arranged to broadcast said cell broadcast message through a radio access network in said network; wherein said plurality of mobile user equipment is arranged to receive said cell broadcast message through said radio access network; wherein said public warning application is arranged to wake up said user equipment and display said textual message of said cell broadcast message on said user equipment; to generate on said user equipment a multicast join message using said content delivery session parameters and to send said multicast join message to the multicast content distributor server through said radio access network; and wherein the multicast content distributor server is arranged to set up a transparent IP multicast session between the multicast content distributor server and at least part of said multitude of user equipment that sent said multicast join message; and to send said at least one multimedia object though said transparent IP multicast session to said at least part of said multitude of user equipment.

12. A multicast content distributor server for distributing multimedia public warning alerts in a mobile telecommunications network using the method in accordance with claim 1, wherein said multicast content distributor server is arranged to:
  send in response to said request for one or more content delivery session parameters for a content delivery session, said content delivery session parameters comprising a multicast IP address;
  set up a transparent IP multicast session between the multicast content distributor server and at least part of said multitude of user equipment that sent said multicast join message; and
  send said at least one multimedia object though said transparent IP multicast session to said at least part of said multitude of user equipment.

13. The method of claim 1, wherein the at least one multimedia object comprises a picture, audio, or video.

14. The method of claim 7, wherein said maximum possible size is larger than 9600 octets (bytes).

15. The system of claim 11, wherein said multimedia object comprises a picture, audio, or video.

* * * * *